Feb. 12, 1963 N. C. FORD, JR 3,077,586

MAGNETIC STORAGE DEVICE

Filed May 25, 1959

INVENTOR.
NORMAN C. FORD JR.

BY

Alvin J. Riddles
ATTORNEY

United States Patent Office 3,077,586

Patented Feb. 12, 1963

3,077,586

MAGNETIC STORAGE DEVICE

Norman C. Ford, Jr., Poughkeepsie, N.Y., assignor to International Business Machines Corporation, New York, N.Y., a corporation of New York Filed May 25, 1959, Ser. No. 815,521
6 Claims. (Cl. 340—174)

This invention relates to magnetic storage devices and more particularly to a thin magnetic film memory device capable of nondestructive readout interrogation by coincident-current techniques.

Certain magnetic materials, notably certain ferro-spinels, and thin metallic film compositions which exhibit the rectangular hysteresis loop, possess the requisite bistable memory characteristics which enable their use as storage elements in computer circuitry.

In general, the information state of such an element is detected by sensing the output produced when a field of sufficient magnitude is applied to reverse the direction of magnetization from one stable state of flux remanence to another stable state. This method of interrogation destroys the original magnetic state of the element and therefore is known as a destructive readout operation. In order to return the element to its original condition a reset mechanism must be provided. It would be of advantage, therefore, to provide a nondestructive readout operation for said bistable memory materials, particularly for thin magnetic films, which would operate by conventional selection methods, such as by coincident-current techniques.

An object of the present invention is, therefore, to provide a thin film magnetic storage device capable of nondestructive interrogation. Another object is to provide a coincident-current nondestructive readout device using thin magnetic films.

The foregoing and other objects, features and advantages of the invention will be apparent from the following more particular description of a preferred embodiment of the invention as illustrated in the accompanying drawings.

Figure 1:
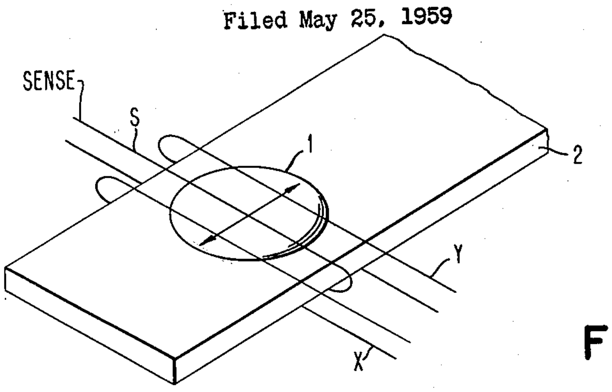
Figure 1A:
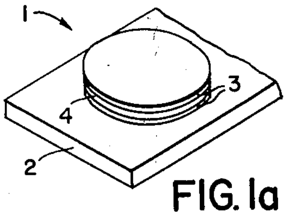

FIGURES 1 and 1*a* illustrate a memory element according to this invention.

Figure 2:
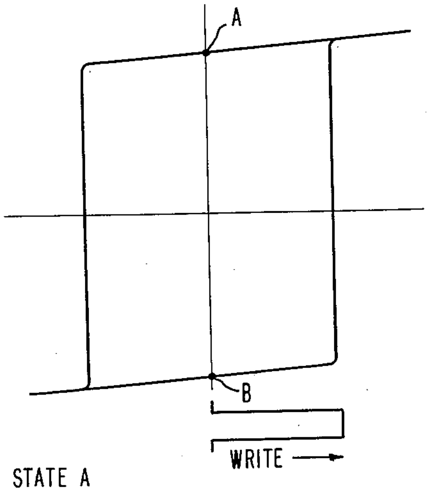

FIGURE 2 is an illustration of a 60-cycle hysteresis loop observed upon switching during a write operation.

Figure 2A:
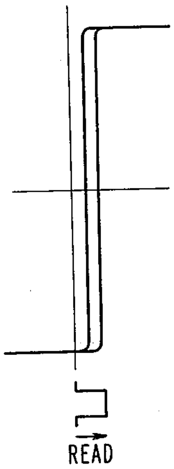

FIGURE 2*a* is a hysteresis loop obtained during a read operation, the film being interrogated with low drive current pulses while in a given stable state.

Figure 2B:
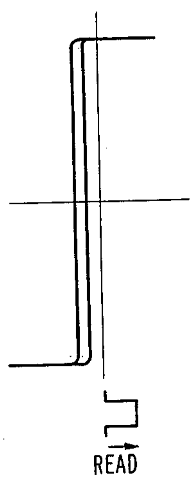

FIGURE 2*b* shows a similar hysteresis loop while the film is in another stable state.

Figures 3, 3A:
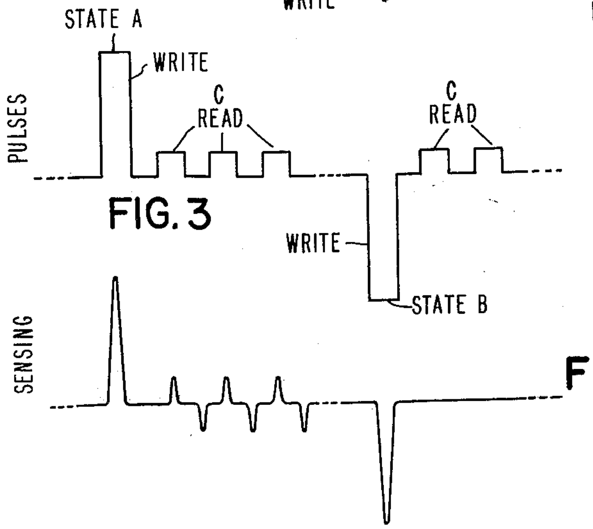

FIGURE 3 illustrates the write and read pulse operations.

FIGURE 3*a* shows the output voltage characteristics obtained during each operation.

The device of the present invention may be interrogated by conventional coincident-current techniques to determine the magnetic state of the film without destroying the stored information present therein. Stated another way, the device of the present invention is capable of readjusting itself successively after each read operation into a condition indicative of the original state of the element.

Referring now to the drawings and specifically to FIGURE 1, there is shown a thin magnetic film 1 having an easy direction of magnetization indicated by the double headed arrow, deposited on a substrate member 2 and adapted to operate through a plurality of windings as a coincident-current non-destructive readout device. Drive windings X and Y are provided to cause the magnetization in the storage portion of the film to assume either of two stable states of flux remanence. These or other windings may be utilized to interrogate the state of the element. Detection is achieved through an output voltage received from sense winding S. While one particular winding configuration is shown it will be realized that other schemes may be used as well.

In operation a write current may be applied coincidentally to X and Y to set the magnetization in one direction along the easy axis of the film, said direction representing a stored binary "1" or "0" bit of information. In this condition the film will exhibit the hysteresis loop characteristics shown in FIGURE 2. This hysteresis loop is known as the storage hysteresis loop. In addition to this loop it has been found that single domain elements of magnetic material exhibiting rectangular hysteresis properties, such as thin magnetic films, can be provided with an interrogation facility which may be considered to be a hysteresis loop of lesser energy content than the principal hysteresis loop of the element. Traversal of the smaller loop will provide a signal indication without disturbing the energy state of the principal hysteresis loop. This hysteresis characteristic is illustrated in FIGURES 2*a* and 2*b* and referred to as an "interrogation" hysteresis loop.

To read out the information stored in the element nondestructively the element may be driven coincidentally or otherwise with a read current pulse which produces a field of magnitude sufficient to traverse the interrogation hysteresis loop present in the film, but of insufficient magnitude to switch the storage loop. This minor loop switching induces an output voltage on the sense winding S if, for example, the film was originally in a stable state designated as A. If, however, the film was in the other stable state, B, a reading current of the same magnitude and polarity will produce no output in the sense winding. After each read pulse is removed, the magnetization in the interrogation loop will return to its original condition, biased in accordance with the state of the storage magnetization.

The write and read operations are summarized in FIGURE 3 and the corresponding sense signals in FIGURE 3*a*. The write pulse A places the film into state A. Thereafter a read pulse C produces an output indicative of this state. A second write pulse B may be applied to switch the film into state B. Read pulses C applied with the film in this state will produce no output on the sense winding, as indicated. Nondestructive sensing as described above may be repeated indefinitely without any observable change in the output signal characteristics.

A thin magnetic film having the characteristics described above is shown in FIGURE 1*a* and may be conveniently provided by a process of vacuum deposition of, for example, an 80–20 Ni—Fe alloy onto a glass substrate 2, to build up a composite thin film 1 of the order of 2000 A. thick having successive layers of high and low coercive force material 3 and 4, respectively.

While the invention has been particularly shown and described with reference to preferred embodiments thereof, it will be understood by those skilled in the art that various changes in form and details may be made therein without departing from the spirit and scope of the invention.

What is claimed is:

1. A thin film memory storage device adapted for nondestructive sensing of its residual history thereof comprising a support member having a thin metallic film deposited thereon, said film having a layer of relatively high coercive force material defining two stable memory states, and a layer of relatively low coercive force material exhibiting either one of two hysteresis loops dependent upon the state of the high coercive force material, only one of said loops being capable of being traversed to produce an output upon interrogation by a reading pulse of a predetermined magnitude and polarity, means for switching the film from one memory state to another, an output winding positioned about said film and means including interrogate windings to apply read pulses of said predetermined magnitude and polarity to induce thereby either a voltage or no voltage on said output winding.

2. The claim according to claim 1 wherein the reading field is applied by coincident-current selection through said interrogate windings.

3. A storage element comprising, a thin film of ferromagnetic material exhibiting an easy axis of magnetization defining opposite stable states of remanent flux orientation, said film comprising successive layers of relatively high and low coercive force material, a plurality of windings including an output winding coupling said film, means including a number of said plurality of windings for switching said film from one to another of said stable states, and means for nondestructively interrogating the stable state of said element comprising means for applying a field of predetermined magnitude and polarity along the easy axis of said film whereby an output signal is induced on said output winding only when said film is in a predetermined one of said stable states.

4. A storage element comprising, a thin film of ferromagnetic material exhibiting an easy axis of magnetization defining opposite stable states of remanent flux orientation, said film comprising successive layers of relatively high coercive force material and relatively low coercive force material, said low coercive force material exhibiting one of two hysteresis loops dependent upon the stable state of said film, a plurality of windings including an output winding coupling said film, means including a number of said plurality of windings for switching said film from one to another stable state, and means for nondestructively interrogating the state of said film comprising means for applying a field of predetermined magnitude and polarity along the easy axis of said film whereby a voltage is induced in said output winding only when said film is in a predetermined one of said stable states.

5. A storage element comprising a planar thin film of magnetic material exhibiting an easy axis of magnetization defining opposite stable states of remanent flux orientation, said film comprising successive layers of magnetic material, alternate layers of said film made of magnetic material exhibiting a given coercive force while the remaining layers of said film exhibit a relatively low coercive force, means for switching said element from one stable state to another, and means including an output winding coupling said film for nondestructively interrogating the state of said element and providing an output signal indicative of its state comprising means for applying a field of predetermined magnitude and polarity along th easy axis of said film whereby a voltage is induced in said output winding only when said film is in a predetermined one of said stable states.

6. A storage element comprising, a planar support member, a thin film deposit of metallic magnetic material on said support member, said film of magnetic material exhibiting an easy axis of magnetization defining opposite stable states of remanent flux orientation, said film comprising successive layers of magnetic material with alternate layers exhibiting a relatively high coercive force and the remaining layers exhibiting a relatively low coercive force, the low coercive force material exhibiting one of two hysteresis loops dependent upon the stable state of said film, means for switching said film from one stable state of flux orientation to another, and means including an output winding coupling said film for nondestructively interrogating the state of said element and providing an indication thereof comprising means for applying a field of predetermined magnitude and polarity along the easy axis of said film whereby a voltage is induced in said output winding only when said film is in a predetermined one of the stable states.

References Cited in the file of this patent

UNITED STATES PATENTS

| | | |
|---|---|---|
| 2,792,563 | Rajchman | May 14, 1957 |
| 2,811,652 | Lipkin | Oct. 29, 1957 |
| 2,900,282 | Rubens | Aug. 18, 1959 |

OTHER REFERENCES

"A Compact Coincident-Current Memory," by A. V. Pohm, Proceedings of Eastern Joint Computer Conference, pp. 120–123, Dec. 10–12, 1956.

"Nondestructive Sensing of Magnetic Cores," by Dudley A. Buck and Werner I. Frank, Communications and Electronics, for January 1954.

"Preparation of Thin Magnetic Films and Their Properties," by M. S. Blois, Jr., Journal of Applied Physics, August 1955.